(12) United States Patent
Wang

(10) Patent No.: US 10,153,004 B2
(45) Date of Patent: Dec. 11, 2018

(54) PLAYBACK SYSTEM FOR VIDEO WITH REPLACEABLE COMMODITIES

(71) Applicant: Kungcheng Wang, Taipei (TW)

(72) Inventor: Kungcheng Wang, Taipei (TW)

( * ) Notice: Subject to any disclaimer, the term of this patent is extended or adjusted under 35 U.S.C. 154(b) by 0 days.

(21) Appl. No.: 15/463,496

(22) Filed: Mar. 20, 2017

(65) Prior Publication Data

US 2017/0316808 A1 Nov. 2, 2017

(30) Foreign Application Priority Data

Apr. 27, 2016 (TW) .............................. 105113187 A

(51) Int. Cl.
| | |
|---|---|
| *G11B 27/036* | (2006.01) |
| *H04N 9/87* | (2006.01) |
| *H04N 21/239* | (2011.01) |
| *H04N 21/472* | (2011.01) |
| *H04N 21/478* | (2011.01) |
| *H04N 21/4782* | (2011.01) |

(Continued)

(52) U.S. Cl.
CPC ............. *G11B 27/036* (2013.01); *H04N 9/87* (2013.01); *H04N 9/8715* (2013.01); *H04N 21/2393* (2013.01); *H04N 21/4782* (2013.01); *H04N 21/47205* (2013.01); *H04N 21/47815* (2013.01); *H04N 21/816* (2013.01); *H04N 21/854* (2013.01)

(58) Field of Classification Search
CPC .................................. G11B 27/036; H04N 9/87
See application file for complete search history.

(56) References Cited

U.S. PATENT DOCUMENTS

| | | | |
|---|---|---|---|
| 2006/0000900 A1* | 1/2006 | Fernandes | .............. G06Q 20/04 235/380 |
| 2007/0214476 A1* | 9/2007 | Zalewski | ........... H04N 7/17318 725/32 |

(Continued)

FOREIGN PATENT DOCUMENTS

| | | |
|---|---|---|
| CN | 1503554 A | 6/2004 |
| CN | 100414955 C | 8/2008 |

(Continued)

OTHER PUBLICATIONS

Taiwan Patent Office, Office Action, Patent Application Serial No. TW105113187, dated Aug. 1, 2016, Taiwan.

(Continued)

*Primary Examiner* — Thai Q Tran
*Assistant Examiner* — Girumsew Wendmagegn
(74) *Attorney, Agent, or Firm* — Rabin & Berdo, P.C.

(57) ABSTRACT

A playback system for video with replaceable commodities includes a video server and a computer program product. The video server includes a video database, a commodity database and an image processing module. The video database stores one or more source videos, each of which includes at least one embedded segment having a plurality of continuous frames with an identical partial area. The commodities database includes at least one 3D commodity model. The image processing module superimposes the 3D commodity model on the partial area of the frames of the embedded segment of the source videos to form at least one composed video. The computer program product is loaded by an end device so as to connect to the video server for playing the composed video.

8 Claims, 9 Drawing Sheets

(51) Int. Cl.
H04N 21/81 (2011.01)
H04N 21/854 (2011.01)

(56) References Cited

U.S. PATENT DOCUMENTS

| | | | |
|---|---|---|---|
| 2012/0272268 A1* | 10/2012 | McCarthy, III | G06Q 30/0621 725/39 |
| 2014/0068664 A1 | 3/2014 | Bourne | |
| 2016/0104513 A1* | 4/2016 | Bloch | G11B 27/34 715/720 |

FOREIGN PATENT DOCUMENTS

| | | |
|---|---|---|
| CN | 103678448 A | 3/2014 |
| JP | 200232590 A | 1/2002 |
| JP | 2003009127 A | 1/2003 |
| JP | 2003051797 A | 2/2003 |
| JP | 2003125414 A | 4/2003 |
| JP | 2005341104 A | 12/2005 |
| JP | 2009529300 A | 8/2009 |
| JP | 2010533345 A | 10/2010 |
| JP | 2012083904 A | 4/2012 |
| JP | 2012248071 A | 12/2012 |
| JP | 2014027635 A | 2/2014 |
| JP | 2015072526 A | 4/2015 |
| JP | 2015176322 A | 10/2015 |
| WO | WO-2014207902 A1 | 12/2014 |

OTHER PUBLICATIONS

Office Action issued in corresponding Japan patent application dated Mar. 13, 2018.

* cited by examiner

PLAYBACK SYSTEM FOR VIDEO WITH REPLACEABLE COMMODITIES

CROSS-REFERENCE TO RELATED APPLICATION

This non-provisional application claims priority under 35 U.S.C. § 119(a) to Patent Application No. 105113187 filed in Taiwan, R.O.C. on Apr. 27, 2016, the entire contents of which are hereby incorporated by reference.

BACKGROUND

Related Field

The instant disclosure relates to a video playback system, in particular, to a playback system for video with replaceable commodities.

Related Art

Along with the prevailing trends of the modern video industry, various commodities are broadly marketed via embedded marketing within movies, TV dramas and TV programs. However, after the film shooting is complete, if the cooperative relationship with the vendors eventually terminates or the film is licensed to overseas territories, the entirety of the film is usually damaged due to the mosaic processing of the embedded commodities, since it is difficult to shoot the film again.

SUMMARY

In one embodiment, an explanatory playback system is provided to conveniently replace inserting commodities in a video.

In one embodiment, a playback system for video with replaceable commodities includes a video server and a computer program product. The video server comprises a video database, a commodity database and an image processing module. The video database stores one or more source videos; each of the source video includes at least one embedded segment; the embedded segment includes a plurality of continuous frames with an identical partial area. The commodity database stores at least one 3D (three-dimensional) commodity model and an image processing module. The image processing module respectively superimposes the 3D commodity model on the partial area of the frames of the source video to form at least one composed video. The computer program product is loaded by an end device; the end device includes a network interface and a playback interface. The computer program product includes a network communication module and a multimedia playback module. The network communication module connects to the video server via the network interface to obtain the composed video. The multimedia playback module plays the obtained composed video via the playback interface.

Via the video playback system provided in the embodiments, the 3D commodity model in the composed video maybe replaced, removed or increased without shooting the video again or adding mosaic to the frame.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
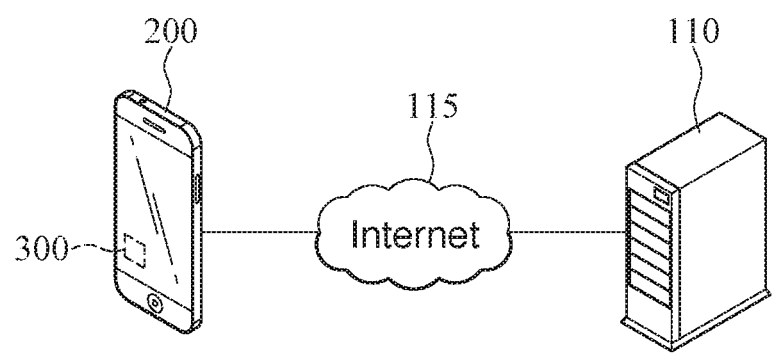
FIG. 1 illustrates a framework diagram of a playback system for video with replaceable commodities according to a first embodiment of the instant disclosure.

Please refer to FIG. 1, which illustrates a framework diagram of a playback system for video with replaceable commodities (hereinafter "playback system"), according to a first embodiment of the instant disclosure. The playback system includes a video server 110, and a computer program product 300 loaded from an end device 200. The end device 200, for example may be smart phone, tablet computer, notebook computer or desktop computer, etc. (a smart phone is taken as an example hereinafter), includes a processor (such as a system chip, central processing unit, graphic processor, etc.), storage media (such as a hard drive or flash memory), volatile memory (such as Dynamic Random Access Memory, DRAM), a communication module (such as a network interface card, wireless Internet module, mobile communication module, etc.), and peripheral hardware (such as a speaker, display, touch control module, etc.), etc. The communication module is capable of connecting to the Internet 115. The computer program product 300 may be stored in an application server (not shown), so that the end device 200 may connect to the application server by its communication module via Internet 115 and download the computer program product 300. The storage media of the end device 200 may store the computer program product 300 so that the processor may load and execute the computer program product 300. The communication module of the end device 200 may connect with the video server 110 via Internet 115, which will be described in detail in the following.

Figure 2:
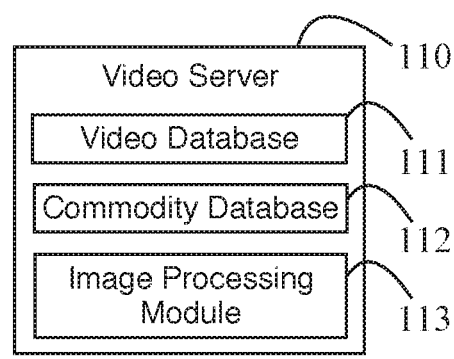
FIG. 2 illustrates a block diagram of a video server according to the first embodiment of the instant disclosure.
Figure 3:
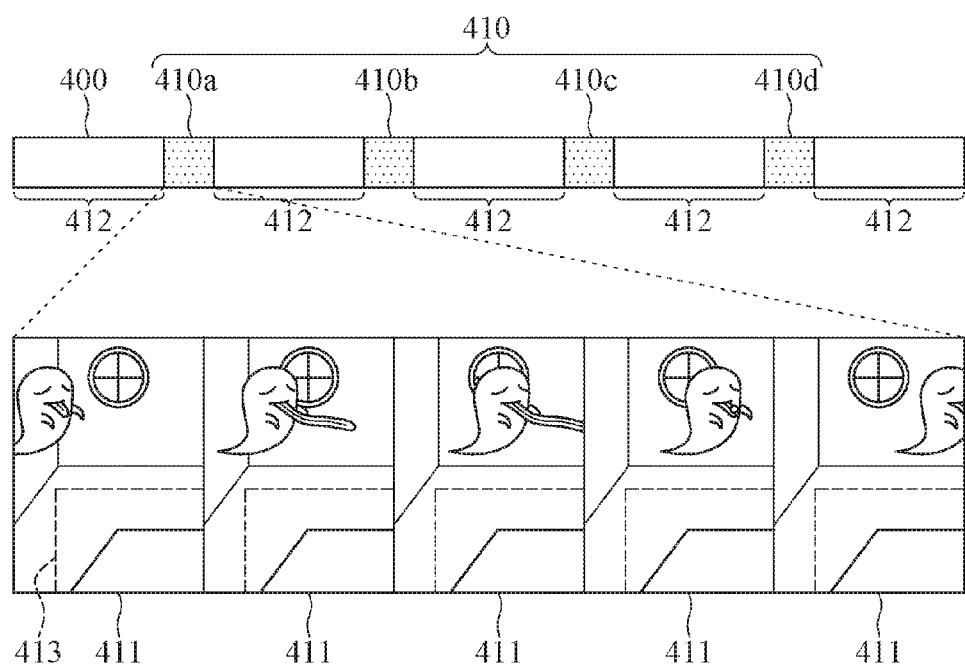
FIG. 3 illustrates an explanatory diagram of a source video according to one embodiment of the instant disclosure.

Please refer to FIG. 2, which illustrates a block diagram of a video server 110 according to the first embodiment of the instant disclosure. The video server 110 includes a video database 111, a commodity database 112 and an image processing module 113. Please refer to FIG. 2 and FIG. 3 jointly. FIG. 3 illustrates an explanatory diagram of a source video according to one embodiment of the instant disclosure. The video database 111 may store one or more source videos 400. Each source video 400 includes at least one embedded segment 410. The embedded segment 410 includes plural continuous frames 411; each of the frames 411 has an identical partial area 413. In other words, the source video 400 comprises plural frames (411, 412), wherein a portion of each of the continuous frames 411 is defined as an embedded segment 410 that includes a partial area 413 identical to one another. Here a given example is the partial area 413 at the right bottom corner of the frame, which should not be the limitations of the area according to the embodiment of the instant disclosure. In this embodiment, a desktop is taken as an example for the partial area 413. Except for the partial area 413, the areas of the frame 411 may have dynamic changes. For example, in this embodiment a ghost image moves from the left top area to the right top area of the frame. However, the content of the video should not be limited to the ghost image or any other visible materials. Additionally, except for the partial area 413, the areas of the frame 411 may remain the same without any changes; namely the entire frame 411 is still with no changes. In this embodiment, only the five frames 411 are illustrated in the embedded segment 410, to make the diagram clearer. However a person having ordinary skills in the art should be able to understand that the amount of the frames 411 in the embedded segment 410 should not be a limitation to the embodiment.

Figure 4:
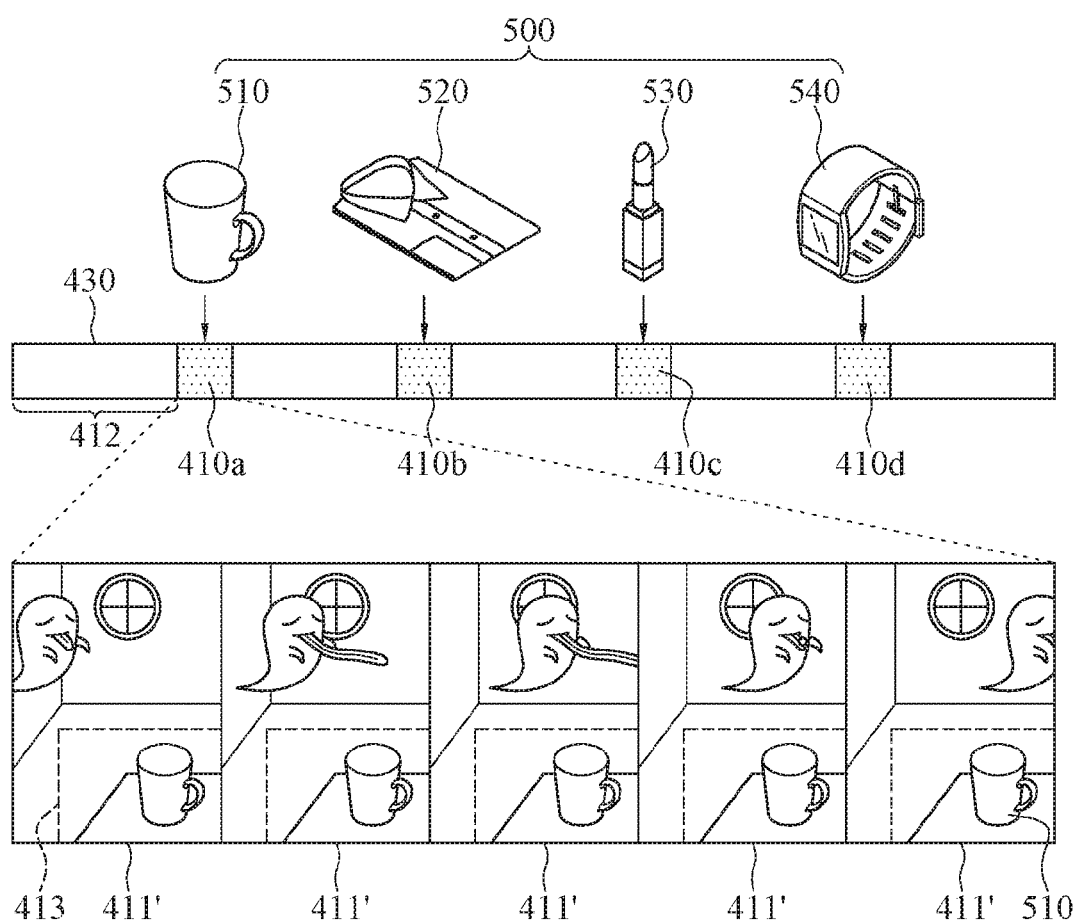
FIG. 4 illustrates an explanatory diagram of a composed video according to one embodiment of the instant disclosure.

FIG. 4 illustrates an explanatory diagram of a composed video 430 according to one embodiment of the instant disclosure. Jointly referring to FIG. 2 and FIG. 4, the commodity database 112 stores at least one 3D commodity model 500. Here, an example is given with four 3D commodity models 510, 520, 530 and 540. 3D commodity model 510 is shaped as a cup; 3D commodity model 52 is shaped as a cloth; 3D commodity model 530 is shaped as a lipstick; 3D commodity model 540 is shaped as a watch. However these shapes are explanatory only and should not be limitations to the embodiment of the instant disclosure. The image processing module 113 is adapted to process the source video 400, more specifically, respectively superimposes (or embedding or inserting), at least one 3D commodity model 500 on the partial area 413 of the frame 411 of each of the source videos 400, so as to form at least one composed video 430. In FIG. 4, an explanatory cup-shaped 3D commodity model 510 is superimposed on the desktop of the frame 411' of the embedded segment 410a. In addition, the same source video 400 (composed video 430), may further include other embedded segments 410, for example embedded segments 410b, 410c and 410d, each of which may have different 3D commodity model 500 embedded therein. Here, the embedded segment 410b is shown with the cloth-shaped 3D commodity model 520 embedded therein; embedded segment 410c is embedded with the lipstick-shaped 3D commodity model 530; and embedded segment 410d is embedded with the watch-shaped 3D commodity model 540. Here the 3D commodity model 500 is embedded in the embedded segment 410 as in a still form. However, in other embodiments, 3D commodity model may be embedded in the embedded segment 410 as in a dynamic form. In other words, the same embedded 3D commodity model 500 embedded in the frames 411, of the embedded segment 410 may have a different angle, size, or position, or may be movable or rotatable.

The video database 111 may store the composed video 430 after the composed video 430 is processed. The composed video 430 stored by video database 111 may include all the various combinations of embedding various 3D commodity models 500 to the source video 400. In other words, the same embedded segment 410 of the same source video 400 may be embedded with various 3D commodity models 500 to form plural composed videos 430. Accordingly, storing the combinations of 3D commodity models 500 and source videos 400 in the video database 111 in advance, facilitates a direct select-and-play operation of a composed video 430 with a certain 3D commodity model 500 embedded in a certain embedded segment 410, which does not need instant image processing and thus avoids the need to increase computing resources.

Figure 5:
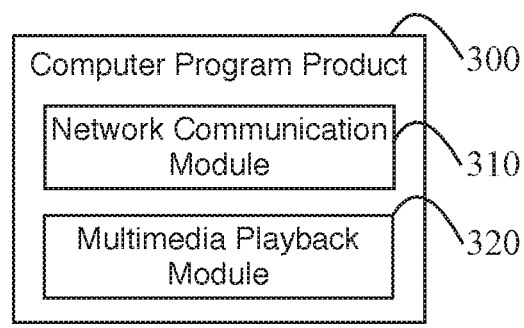
FIG. 5 illustrates a block diagram of a computer program product according to the first embodiment of the instant disclosure.
Figure 6:
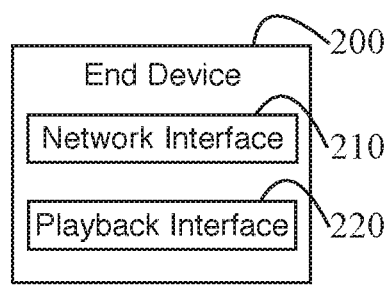
FIG. 6 illustrates a block diagram of an end device according to the first embodiment of the instant disclosure.

Please refer to FIG. 5 and FIG. 6, which are the block diagrams of a computer program product 300 and an end device 200 according to the first embodiment of the instant disclosure. Computer program product 300 includes a network communication module 310 and a multimedia playback module 320. The end device 200 includes a network interface 210 and a playback interface 220. The network communication module 310 may connect to the video server 110 via the network interface 210, wherein the network interface 210 may be realized by the communication module mentioned above. After establishing a communication connect with video server 110 (via Internet 115), the network communication module 310 may obtain, from the video server 110, at least one composed video 430 stored in video database 111. After obtaining at least one composed video 430, multimedia playback module 320 plays the obtained composed video 430 via the playback interface 220. Multimedia playback module 320 is able to decode the composed video 430, and play the frames and the sounds of the composed video 430 via the playback interface 220. The playback interface 220 may be realized by the processor, speaker, display and relevant components mentioned above.

Through the above-mentioned playback system with replaceable commodities, video server 110 may provide composed videos 430 embedded with specific 3D commodity model(s) 500 to the end device 200 loaded with the computer program product 300, so that a user may operate end device 200 to choose the composed video(s) 430 he/she would like to watch. These 3D commodity models 500 may be the embedded marketing goods. When the vendor is changed, the source video 400 can still be used repeatedly by replacing the 3D commodity model 500 without shooting the film again, so the film production cost can be well saved. Therefore, for different computer program products 300 on sale in the application stores of different countries or being executed in different countries, video server 110 may provide dedicated composed videos 430 with different embedded marketing goods.

Figure 7:
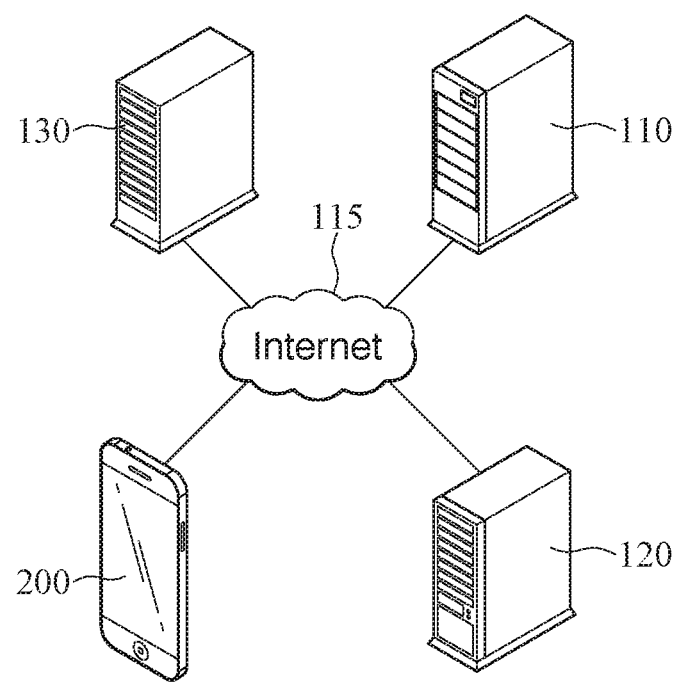
FIG. 7 illustrates a framework diagram of a playback system for video with replaceable commodities according to a second embodiment of the instant disclosure.

Please refer to FIG. 7, which illustrates a framework diagram of a playback system for video with replaceable commodities according to a second embodiment of the instant disclosure. In comparison with the first embodiment above, the playback system of this embodiment further includes a member management server 120 and a shopping server 130. In some embodiments, the playback system may not include the shopping server 130; instead, the playback system collaborates with an external shopping server 130. The video server 110, member management server 120 and shopping server 130 may connect with each other via the Internet 115. In some embodiments, two or more of video server 110, member management server 120 and shopping server 130 may be integrated within the same server, namely the in-between communications may be transmitted inside the server without passing through Internet 115. In another embodiments, two or more of video server 110, member management server 120 and shopping server 130 may be disposed inside a same local network, namely the in-between communications may be transmitted via the local network without passing through Internet 115.

The member management server 120 has member management functions that allow users to register and log in, record users' viewing records for the composed videos and preferred embedded goods (3D commodity models 500), and record users' purchase records in the shopping server 130 (described below).

Figure 8:
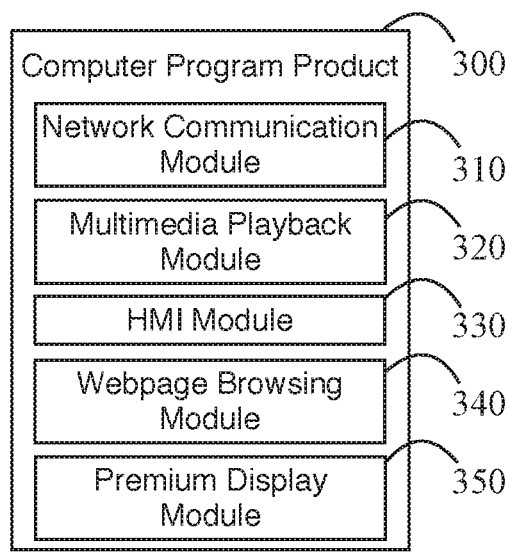
FIG. 8 illustrates a block diagram of a computer program product according to the second embodiment of the instant disclosure.
Figure 9:
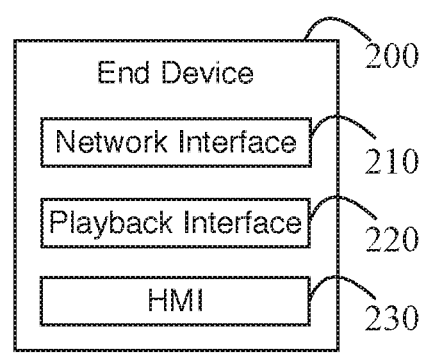
FIG. 9 illustrates a block diagram of an end device according to the second embodiment of the instant disclosure.

Please refer to FIG. 8 and FIG. 9, which respectively illustrate block diagrams of a computer program product 300 and an end device 200 according to the second embodiment of the instant disclosure. Comparing to the first embodiment above, the end device 200 according to this embodiment further includes a human-machine interface (HMI) 230. HMI 230 may be realized by the display and touch control module mentioned above. In addition, comparing to the first embodiment above, the computer program product 300 according to this embodiment further includes a human-machine interface module (HMI module) 330, a webpage browsing module 340 and a premium display module 350, which will be further introduced in the following paragraphs.

Figure 10:
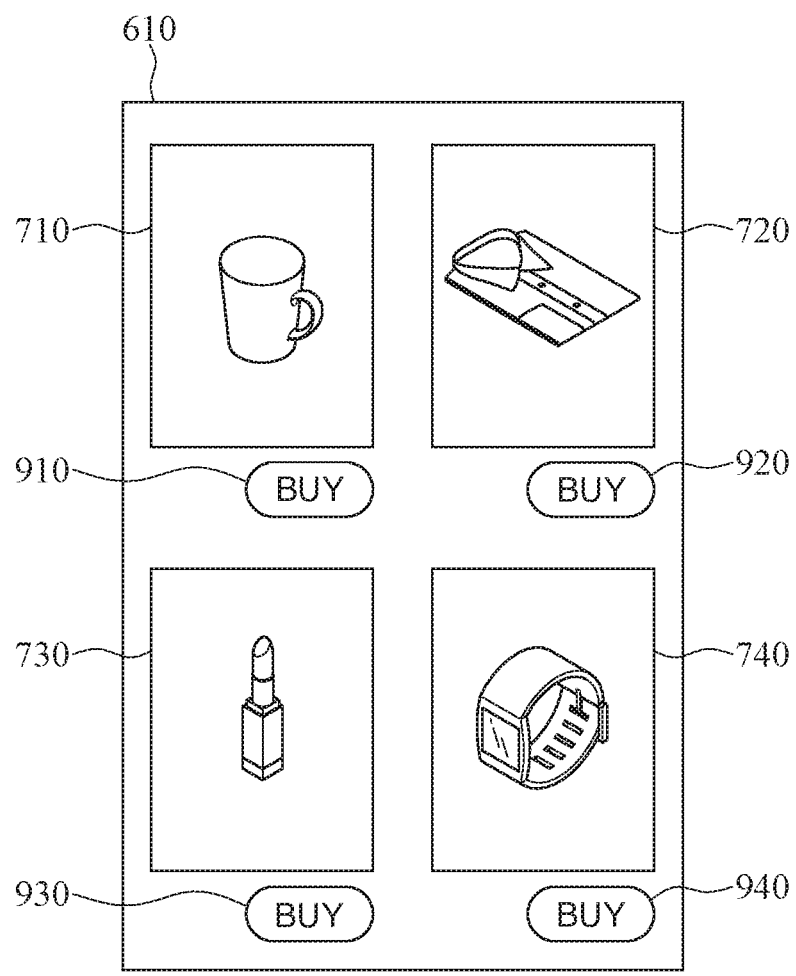
FIG. 10 illustrates an explanatory diagram (1) of an operating window according to the second embodiment of the instant disclosure.

FIG. 10 illustrates an explanatory diagram (1) of an operating window 610 according to the second embodiment of the instant disclosure. Jointly referring to FIG. 8, FIG. 9, and FIG. 10, when said composed video 430 is played, the HMI module 330 of the computer program product 300 displays an operating window 610 via the HMI 230. The operating window 610 includes plural commodity options 710, 720, 730, 740 respectively corresponding to the 3D commodity models 510, 520, 530, 540 shown in the composed video. Via HMI 230, users may choose the corresponding commodity options 710, 720, 730, 740 based on the preferred 3D commodity models 500. The network communication module 310 of the computer program product 300, in response to the triggering of the commodity options 710, 720, 730, 740 (commodity option 710 is taken as an example in the following), transmits an playback request to the video server 110 via the network interface 210. The video server 110, based on the playback request, transmits an composed video 430 with a 3D commodity model 510 corresponding to the triggered commodity option 710 to the end device 200. The composed video 430 may be transmitted via electronic file transmission, or streaming transmission. After the end device 200 receives the entire or a portion of the transmitted composed video 430, the multimedia playback module 320 of the computer program product 300 plays the obtain composed video 430 via the playback interface 220. Accordingly, users may watch the composed videos 430 with certain 3D commodity models 500 based on personal preferences.

As shown in FIG. 10, the operating window 610 further includes at least one purchase option (plural purchase options 910, 920, 930, 940 are introduced here as an example). Each of the purchase options 910, 920, 930, 940 corresponds to said 3D commodity models 510, 520, 530, 540 respectively, and correspondingly aligns with the commodity option 710, 720, 730, 740 (in the example here the purchase options 910, 920, 930, 940 are disposed under the corresponding commodity options 710, 720, 730, 740). The network communication module 310 of the computer program product 300, in response to the triggering of the purchase options 910, 920, 930, 940 (the example here is that the user selects the purchase option 910 corresponding to the cup via HMI 230), connects to the shopping server 130 via the network interface 210. Thus, the shopping server 130 may provide a shopping webpage (not shown), via the network interface 210 to the webpage browsing module 340. The webpage browsing module 340 supports the function of browsing webpages, and is capable of displaying the shopping webpage via the playback interface 220. Here, the shopping webpage includes the good corresponding to the 3D commodity model 710 (the cup in this example). Accordingly, by triggering of the good(s) shown in the composed video 430, users are able to directly connect to the corresponding shopping webpage via the operating window 610 for further purchasing operation.

After the user completes the transaction, the shopping server 130 transmits a transaction result to the member management server 120. The member management server 120 may transmit an electronic coupon to the end device 200 according to the transaction result. Since the member management server 120 may acknowledge if the transaction if completed according to the transaction result, a type of the electronic coupon transmitted by the member management server 120 correlates to whether the transaction at the shopping webpage is completed. In other words, if the transaction is completed, the transmitted electronic coupon may be a coupon with more discounts or less usage limitations. On the contrary, if the transaction is not completed, the transmitted electronic coupon may be a coupon with lower discounts or more usage limitations. Additionally, the transaction result may also include a shopping list, so that the member management server 120 may select an electronic coupon similar or related to the goods in the shopping list. In addition, the member management server 120 may produce shopping records based on the shopping list for the member's review afterwards. The premium display module 350 of the computer program product 300 may display said electronic coupon via the HMI 230. Accordingly, the user may show the electronic coupon to the store staff to enjoy the premiums of the electronic coupons while shopping. Therefore, the behavior of viewing digital media may achieve the benefits of facilitating actual physical purchasing behaviors. However the electronic coupon of the embodiment is not limited to be used in physical stores. Here the electronic coupon may also be a coupon for online shopping, or other digital premiums such as stickers, bonuses, etc. In some embodiments, the electronic coupon may include readable identity such as 1D (dimension), 2D or 3D barcode, which allows store staffs to read the electronic coupon with the suitable reader(s).

In some embodiments, the video server 110 records a playback amount of the composed video 430 played by the end device 200. When the playback amount reaches a threshold amount, an electronic coupon is transmitted to the end device 200. Accordingly, users are encouraged to watch the composed videos 430, thereby increasing the exposure of the embedded marketing goods (namely 3D commodity model 500). The playback amount here may mean the played times of the same composed video 430, the played times of all the composed videos 430, or the amount of the played composed video 430.

Figure 11:
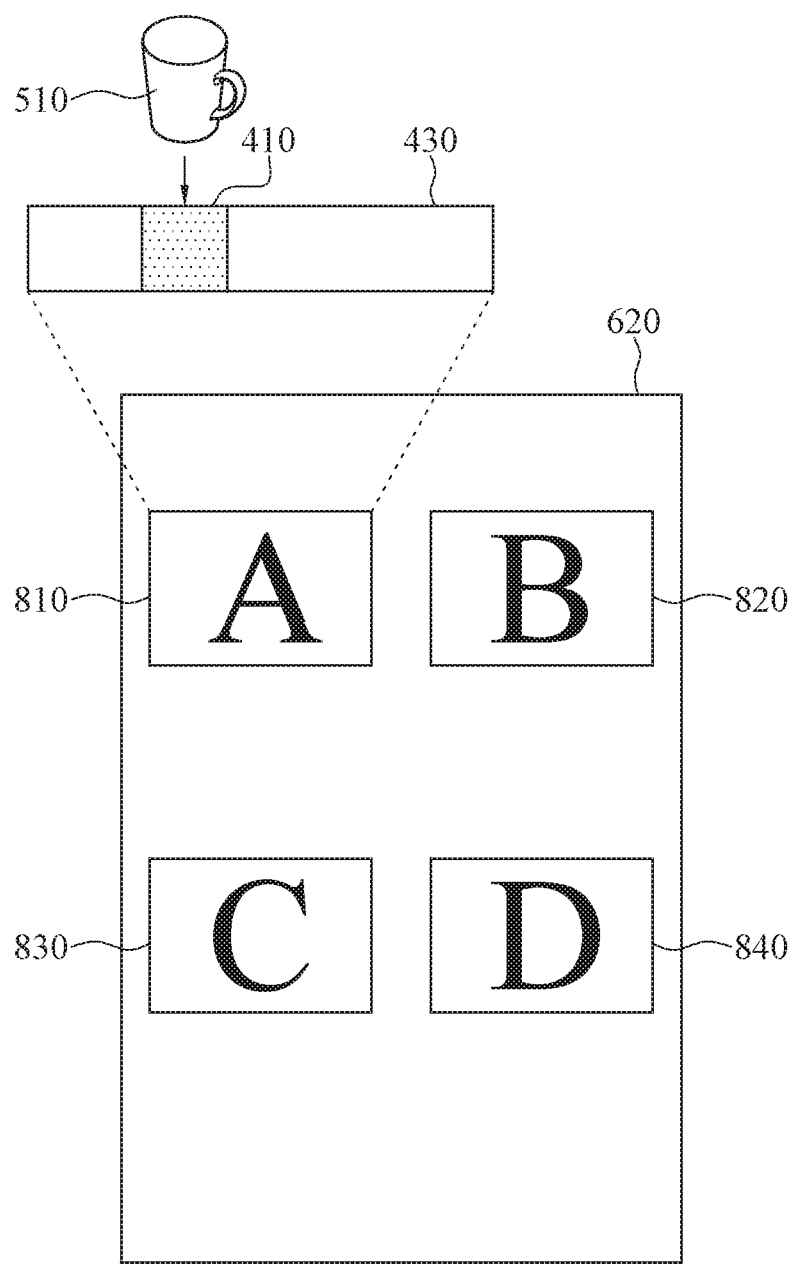
FIG. 11 illustrates an explanatory diagram (2) of an operating window according to the second embodiment of the instant disclosure.

FIG. 11 illustrates an explanatory diagram (2) of an operating window 620 according to the second embodiment of the instant disclosure. Please refer to FIG. 10 and FIG. 11 jointly, in which after a composed video 430 is played, the HMI module 330 of the computer program product 300 may display the operating window 610 via the HMI 230. After the user selects a commodity option (such as 710) on the operating window 610, the HMI module 330, in response to the triggering of the commodity option 710, displays another operating window 620. The operating window 620 includes plural next video options 810, 820, 830, 840. Each of the next video options 810, 820, 830, 840 correlates to the composed video 430 with the 3D commodity model 510 corresponding to the triggered commodity option 710. Namely, the user selects one of the next video options (810) via the HMI 230, and then the video server 110 transmits the corresponding composed video 430 to the end device 200. Said corresponding composed video 430 is formed by embedding the corresponding 3D commodity model 510 in the selection of previous operating window 610 into the corresponding source video 400 of the video content of the selected next video option. The operating window 620 here may show multiple next video options 810 corresponding to composed videos 430 with different contents. These composed videos 430 are based on source videos 400 with different contents and formed by embedding with an identical 3D commodity model 510. Therefore, the user may select different next video options 810, and make the film go along with different story lines and determine the story direction of the film. In the meantime, the user may also see the preferred embedded marketing goods (3D commodity models 510) in the composed videos 430.

Figure 12:
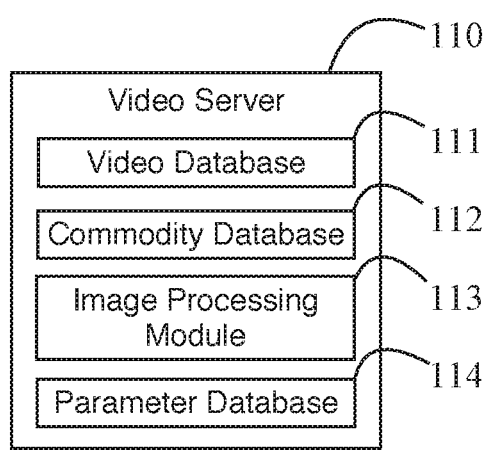
FIG. 12 illustrates a block diagram of a video server according to the second embodiment of the instant disclosure.

Please refer to FIG. 12, which illustrates a block diagram of a video server 110 according to the second embodiment of the instant disclosure. Comparing to the first embodiment, another difference of this embodiment is that the video server 110 further includes a parameter database 114. The parameter database 114 includes plural superimposing parameters for each of the 3D commodity models 500 corresponding to each of the embedded segments 410 of each of the source videos 430. The superimposing parameter may include light/shadow directions, disposing position, disposing angle and scaling size. Through the settings of the superimposing parameters, the source video 430 may look more vivid after being embedded with the 3D commodity model(s) 500.

Therefore, the playback system for video with replaceable commodities according to the embodiments of the instant disclosure allows video/film providers to collaborate with the vendors by conveniently embedding or replacing the marketing goods (3D commodity models 500) in the source video 400. Additionally, after the user watches the composed video 430, a shopping webpage of the marketing good(s) is conveniently connected via the operating window 610, so that the user does not need to find the genuine product source, thereby avoiding the purchase of counterfeiting goods. Furthermore, via the operating windows 610, 620, the user himself/herself may determine the direction of the story lines in the composed video 430, as well as the goods embedded therein, which increases the interactivity and pleasure of watching films. Through the member management server 120, different electronic coupons may also be offered to users under different certain conditions, especially based on level of involvement or preferred embedded goods while watching the composed video(s) 430, so that the behavior of watching digital media may achieve the benefits of facilitating actual physical purchasing behaviors.

What is claimed is:
1. A playback system, comprising:
a video server, comprising:
a video database, storing one or more source videos, each of the source videos including at least one embedded segment, the embedded segment including a plurality of continuous frames with an identical partial area;
a commodity database, storing a 3D (three-dimensional) commodity model; and
an image processing module, respectively superimposing the 3D commodity model on the partial area of the frames of the source video to form at least one composed video; and
a computer program product loaded by an end device, the end device comprising a network interface and a playback interface, the computer program product comprising:
a network communication module, connecting to the video server via the network interface to obtain the composed video; and
a multimedia playback module, playing the obtained composed video via the playback interface;
wherein the computer program product further comprises a HMI module, and the end device comprises a HMI, the HMI module showing an operating window via the HMI, the operating window comprising a commodity option corresponding to at least one of a plurality of the 3D commodity models, the HMI module, in response to a triggering of the commodity option, showing a plurality of next video options, each of the next video options correlating to the obtained composed video with a 3D commodity model therein corresponding to the triggered commodity option.

2. The playback system according to claim 1, wherein the played obtained composed video includes a plurality of the embedded segments, and each of the embedded segments includes a 3D commodity model differing from another 3D commodity model, and after the obtained composed video is played, the HMI module displays the operating window via the HMI, the operating window including a plurality of commodity options corresponding to 3D commodity models shown in the obtained composed video.

3. The playback system according to claim 1, the network communication module, in response to the triggering of the commodity option, transmitting a playback request to the video server via the network interface to receive the obtained composed video with the at least one of the plurality of 3D commodity models corresponding to the triggered commodity option, the multimedia playback module playing the obtained composed video via the playback interface.

4. The playback system according to claim 1, wherein the computer program product further comprises a webpage browsing module, after the obtained composed video is played, the HMI module shows another operating window via the HMI, the other operating window including at least one purchase option, the purchase option corresponding to a 3D commodity model shown in the obtained composed video, the network communication module, in response to a triggering of the purchase option, connecting to a shopping server via the network interface, the shopping server providing a shopping webpage to the webpage browsing module via the network interface, the shopping webpage including goods corresponding to the 3D commodity model shown in the obtained composed video.

5. The playback system according to claim 4, wherein the system further comprises a member management server, the shopping server transmitting a transaction result to the member management server, the member management server transmitting an electronic coupon to the end device according to a transaction result, a type of the electronic coupon correlating to whether a transaction at the shopping webpage is completed.

6. The playback system according to claim 5, wherein the computer program product further comprises a premium display module that displays the electronic coupon via the HMI.

7. The playback system according to claim 1, wherein the video server records a playback amount of the obtained composed video played by the end device, and an electronic coupon is transmitted to the end device when the playback amount reaches a threshold amount.

8. The playback system according to claim 1, wherein the video server further comprises a parameter database, the parameter database including a plurality of superimposing parameters for each of 3D commodity models corresponding to the embedded segment of the source video, the superimposing parameter including light/shadow directions, disposing position, disposing angle and scaling size.

* * * * *